Oct. 4, 1949.  T. L. SHERMAN  2,483,941
BRAKING SYSTEM
Filed Feb. 19, 1945  2 Sheets-Sheet 1
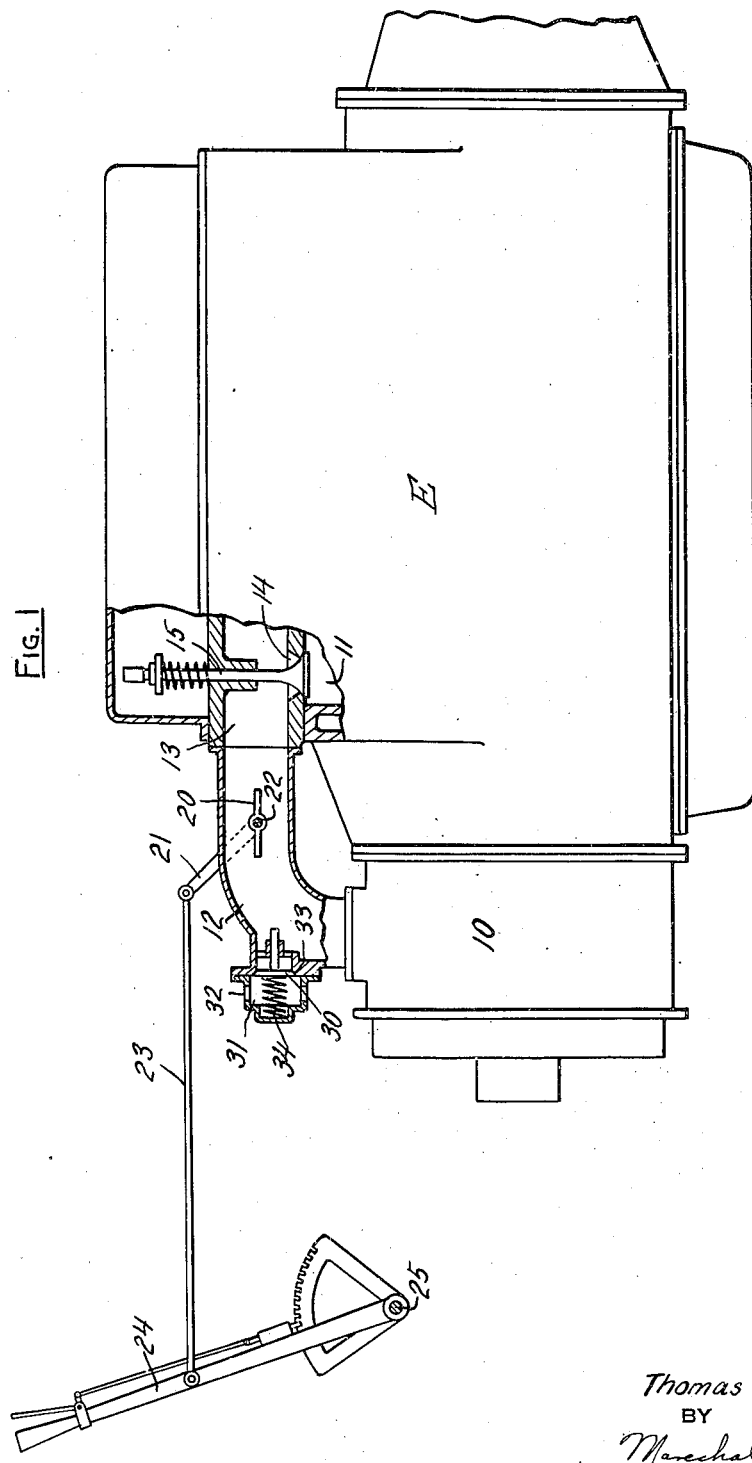
INVENTOR
Thomas L. Sherman
BY
Marechal and Biebel
ATTORNEYS

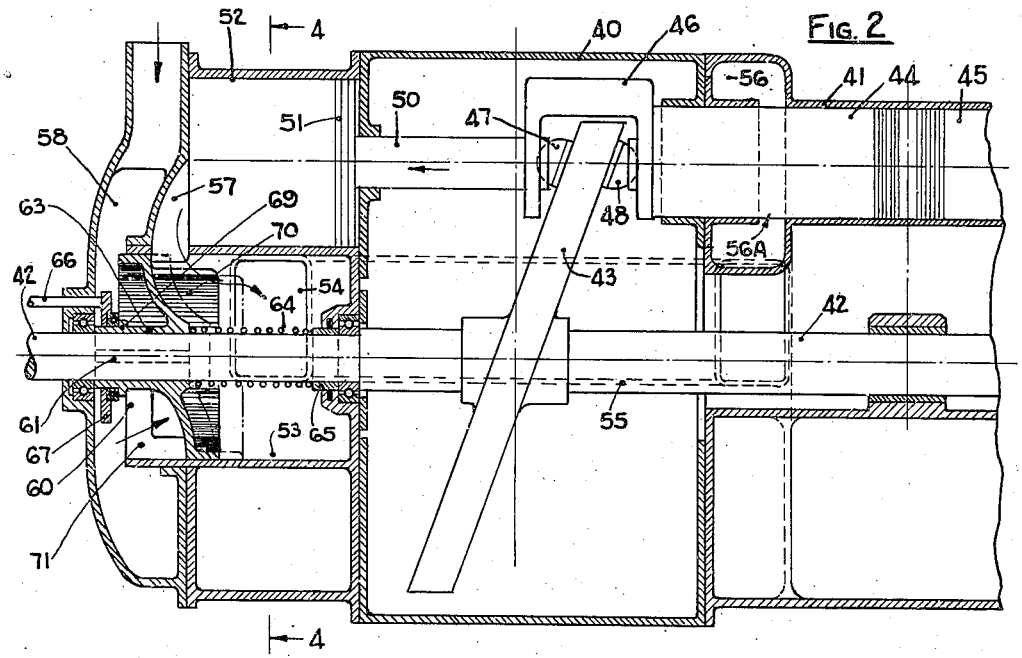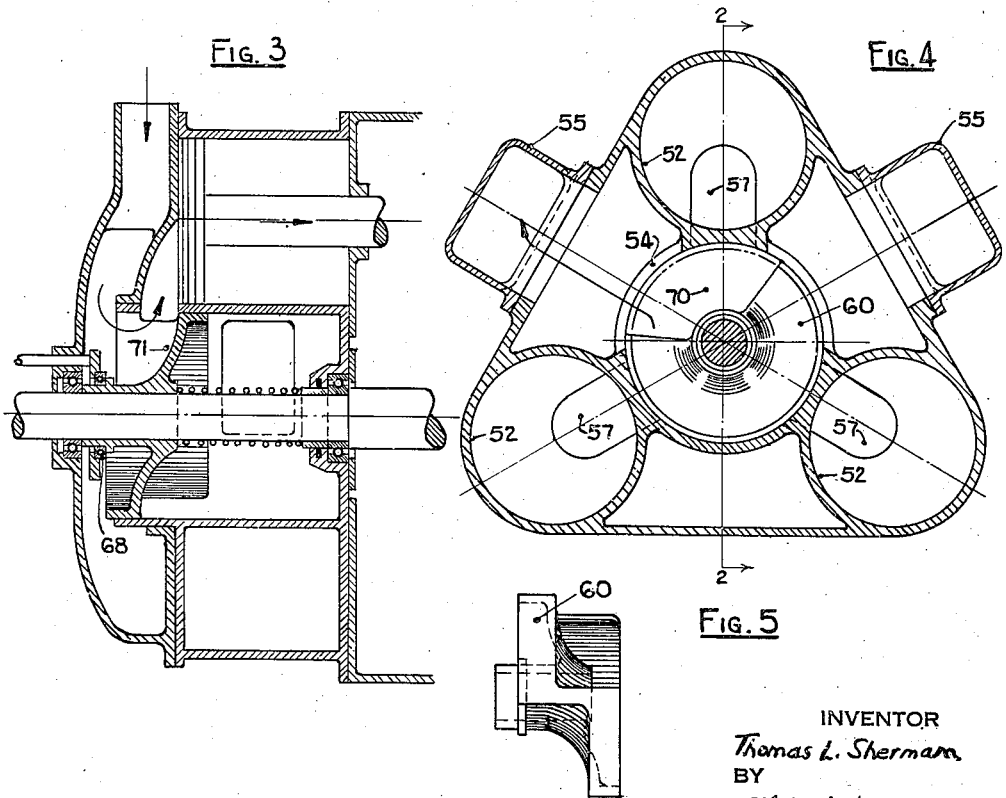

Patented Oct. 4, 1949

2,483,941

UNITED STATES PATENT OFFICE 2,483,941

BRAKING SYSTEM

Thomas L. Sherman, Springfield, Ohio, assignor to The Steel Products Engineering Company, Springfield, Ohio, a corporation of Ohio Application February 19, 1945, Serial No. 578,594

4 Claims. (Cl. 123—58)

This invention relates to braking systems for use in conjunction with internal combustion engines.

As is well known, it is common to increase the braking effect in a motor vehicle by shifting the drive to second or first speed and using the motoring over of the engine as a brake. This results in turning over the engine at relatively high speeds. The braking effect secured in this way is of comparatively small magnitude and insufficient for heavy vehicles.

In the case of Diesel or other heavy duty engines, the increase in speed due to the gearing is objectionable because of the heavier construction of the reciprocating parts. The inertia loadings which may be safely imposed on these engines limit maximum rotative speeds. When motor vehicles powered by such engines are making long descents it is therefore desirable to avoid the necessity of objectionably speeding up the engine to increase its braking effect. It is also frequently found that if the engine is allowed to cool off in making such a descent, it may be quite difficult to start the power operation of the engine when desired.

In two cycle engines it is usual to couple an air compressing or blowing unit to the engine either directly or indirectly, the compressed air being conducted to the cylinders for scavenging.

This invention has for its salient object to provide means for developing a highly effective braking effect in an engine and particularly an engine of the two cycle type which is smooth and uniform in its action, which does not require operation of the engine at an objectionably high speed and which is readily controllable.

Another object of the invention is to provide means for increasing the braking effect of engines having directly connected blowers or compressing units and particularly of engines of the two cycle type.

Another object of the invention is to increase the efficiency of the engine after the engine has been used as a brake and to maintain the engine sufficiently heated so that power operation may be resumed when desired without delay.

Further objects of the invention will appear from the following description, the accompanying drawings and the appended claims.

In the drawings:

Fig. 1 is a side elevational view partly in section of an internal combustion engine and illustrating a brake lever connected to a valve in the engine for developing and controlling the braking effect on the engine;

Fig. 2 is a longitudinal sectional elevation of another type of engine having incorporated therein valve mechanism for increasing the braking effect of the engine, the valve in this view being positioned to control the passage of air from the compression cylinder leading to the engine cylinders for scavenging and charging purposes. This view is taken substantially on the line 2—2 of Fig. 4.

Fig. 3 is a fragmentary view similar to Fig. 2 but showing the valve in position to open the passage for the air from the inlet chamber into the compression cylinder;

Fig. 4 is a transverse sectional elevation taken substantially on line 4—4 of Fig. 2; and Fig. 5 is an elevational view of the valve.

In the particular embodiment of the invention illustrated in Fig. 1, there is shown an internal combustion engine E which may be a two cycle or four cycle engine, but is preferably a two cycle Diesel type engine. An air pump 10 is mounted on one end of the engine casing and is driven by power derived from the engine shaft being suitably direct connected thereto. This pump may be in the nature of a supercharger for a four cycle engine or in the nature of a scavenge pump for a two cycle engine.

The engine E is provided with a plurality of cylinders, a portion of one cylinder 11 being shown in section. The pump 10 is connected by a conduit 12 to an air manifold 13 which communicates with the cylinders through ports 14 controlled by valves 15 which are operated in the usual manner to admit the air to the cylinders at the proper period in the cycle of operation thereof.

A valve, such as the butterfly valve 20, is mounted in the conduit 12 and controls the passage of air from the pump 10 to the cylinders. A lever 21 is connected to the valve spindle 22 and is connected by a link 23 to a lever 24 of the usual brake lever construction. The lever 24 is secured to a spindle 25 which is preferably connected in the usual well known manner to operate the vehicle brakes.

When the lever 24 is operated to throw on the brakes the butterfly valve 20 will be rotated to close or, if desired, to partially close the passage through the conduit 12 and thus obstruct the passage of air through the conduit to the cylinders. This obstruction will obviously build up a back pressure on the pump, thus requiring an increase in the torque necessary to rotate the pump. Since engine and pump are directly connected to the wheels of the vehicle the braking effect on the same will be determined by the pressures against which the compressor pump 10 has to operate.

In order to prevent excessive air pressures in the pump a relief valve 30 is mounted on the conduit 12. This valve is disposed in a chamber 31 having outlet openings or ends 32 and having a port 33 which is normally closed by the valve 30. A spring 34 retains the valve in closed position. The port 33 communicates with the conduit 12.

In addition to obtaining a braking effect by the operation of the throttle valve 20 in the conduit 12, the air will be heated due to a higher degree of compression in the scavenge or compressor pump and this heated air will tend to keep the engine pistons warm and permit immediate resumption of normal combustion conditions in the engine cylinders when the braking period is over.

In the embodiment of the invention illustrated in Figs. 2-5 inclusive, there is shown an engine of the barrel or crankless type comprising a casing 40 having formed therein a plurality of power cylinders 41, the drawing illustrating a construction incorporating three power cylinders. A shaft 42 is mounted in the engine casing in suitable bearings and carries a slant or swash plate 43, the cylinders 41 being disposed symmetrically about and parallel to the shaft 42.

In Fig. 2 the engine illustrated in an opposed piston two cycle engine, the pistons in the cylinder 41 being illustrated at 44 and 45. The power piston 44 has secured thereto a yoke or bridge 46 which carries pivotally mounted slipper bearing elements 47 and 48 which engage the opposite faces of the slant 43 and communicate the reciprocating motion of the piston to the slant by which this reciprocating motion is converted into rotary motion.

The yoke 46 has secured thereto a rod 50 on which is mounted a piston 51 which is disposed in an air compression or pump cylinder 52. These pump cylinders are arranged coaxially with the respective power cylinders. A central chamber 53 is formed in the casing and is centrally disposed relative to the cylinders 52. The chamber 53 has discharge ports 54 which are connected by suitable conduits 55 to the scavenge chamber thence through ports 56A to cylinders 41. Air is alternately compressed in the cylinder 52 and discharged from the same through conduits and air ducts 55 into scavenge chamber 56.

Each pump cylinder has a fixed port or passage 57 which is adapted to communicate alternately with an air inlet chamber 58 and with the chamber 53. The communication between the ports or passages 57 and the air intake or the air discharge chamber is controlled by means of a rotary valve 60 which is slidably mounted on and keyed or splined at 61 to the shaft 42. The valve 60 is mounted on the shaft by means of its hub 63 which engages a spring 64. The spring bears at the other end against a collar 65, and so tends to hold the valve to the left in the position illustrated in Fig. 2 in which it ensures normal operation of the pump for scavenging and charging purposes. The position of the valve longitudinally of the shaft is under manual control and is determined by a rod 66 which can be moved longitudinally in any suitable manner as by a lever (not shown), the rod at its inner end engaging a flange or collar 67 which is carried by a bearing 68 which surrounds the hub 63 and engages a flange 69 thereon.

The rotary valve 60, as illustrated in the drawings, is provided with ports in positions 70 and 71 approximately diametrically opposite. In Fig. 2 the port 70 is in position establishing communication between the cylinder 52 and the discharge chamber 53 so that the outward stroke of piston 51 will cause air to be discharged to chamber 53 thence by air duct 55 to engine cylinder ports 56.

In Fig. 3 the valve 60 has been rotated to a diametrically opposite position with reference to the particular cylinder 52 illustrated and port 71 now establishes communication between the inlet chamber 58 and the cylinder 52. In this position, communication between the cylinder and the chamber 53 is blocked off by the valve.

In Fig. 2 the maximum open position of the valve 60 relative to the cylinder 52 and the chamber 53 is illustrated, but in this figure there is also shown in dot and dash lines an adjusted position of the valve axially inward along shaft 42 in which the discharge between the cylinder 52 and the chamber 53 is restricted and partially closed by the valve. Since the compressor pistons 51 are driven from the shaft 42 it will be evident that the adjustment of the valve to the position shown in dot and dash lines which restricts the passage of the air from the cylinder 52 to the chamber 53, will produce a greater back pressure on the piston 51 thereby increasing the force required to reciprocate the piston 51 on its compression stroke and increasing the braking effect to be obtained by using the compressor pump as a brake.

The cubic displacement of the pump is ordinarily substantially in excess (about 150%) of that of the main engine in order to provide for proper scavenging thereof, and hence it is evident that there is adequate capacity to develop a highly effective braking action. The rotary valve 60 always provides for unrestricted supply of air to the pump on the intake stroke so that the cylinders are properly filled in turn, and depending upon its axial position of adjustment, provides a greater or less resistance and hence braking action. Movement of the valve is readily effected under manual or other suitable control, the increased fluid pressures developed under high braking loads not being effective in such direction as to materially restrict the freedom of adjustment of the valve.

The work absorbed in compressing the air is largely converted into heat which results in raising its temperature. This temperature will be reduced by re-expansion but there will remain some substantial preheating of the air supplied as scavenging air to the cylinders. It will be evident that since air is continuously delivered by the pump past the restricting valve 60 to chamber 53 and into the engine cylinders during the braking period, normal compression of the air charge within the engine cylinders will not be interrupted. The engine pistons will therefore remain in heated condition and the engine may promptly be restored to normal power operation upon supply of fuel thereto, thus avoiding the difficulty in restarting which may occur when the engine is allowed to cool off.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An engine system comprising a shaft, a plurality of power cylinders, pistons in said power cylinders, operative driving connections between said pistons and said shaft, air compression cylinders, pistons in said air compression cylinders operably connected with said shaft, means for conducting heated air from each of said compression cylinders to each of said power cylinders, said heated compressed air serving to heat said power cylinders when not working under power valve means in said conducting means for controlling the admission of air to and the discharge of air from said air compression cylinders, and means for manually adjusting said valve means to restrict the dimensions of the discharge outlet from each of said air compression cylinders to impose a load upon said shaft.

2. An engine system comprising a shaft, a plurality of power cylinders disposed around and parallel to said shaft, pistons in said power cylinders, operative driving connections between said pistons and said shaft, air compression cylinders arranged in substantially coaxial relation with the respective power cylinders, pistons in said air compression cylinders operably connected with said shaft, means for conducting heated air from each of said compression cylinders to each of said power cylinders, said heated compressed air serving to heat said power cylinders when not working under power, rotary valve means in said conducting means for controlling the admission of air to and the discharge of air from said air compression cylinders, and means for manually adjusting said valve means to restrict the dimensions of the discharge outlet from each of said air compression cylinders to impose a load upon said shaft.

3. An engine system comprising a shaft, a plurality of power cylinders, pistons in said power cylinders, operative driving connections between said pistons and said shaft, air compression cylinders, pistons in said air compression cylinders operably connected with said shaft, means for conducting heated air from each of said compression cylinders directly to each of said power cylinders, said heated compressed air serving to heat said power cylinders when not working under power rotary valve means in said conducting means for controlling the admission of air to and the discharge of air from said air compression cylinders, means mounting said valve for longitudinal movement, and means for longitudinally adjusting said valve means to vary the dimensions of the discharge outlet from each of said air compression cylinders to impose a braking load upon said shaft.

4. An engine system comprising a shaft, a plurality of power cylinders arranged with their axes parallel with said shaft, pistons in said cylinders, driving connections between the pistons and shaft including a swash plate, air compression cylinders also arranged with their axes parallel with said shaft, pistons in said air compression cylinders, driving connections for said air compression pistons including said swash plate, means for conducting heated air from each of said compression cylinders directly to each of said power cylinders, said heated compressed air serving to heat said power cylinders when not working under power rotary valve means in said conducting means on said shaft for controlling the admission of air to and the discharge of air from each of said air compression cylinders, and means for manually adjusting said valve means to restrict the dimensions of the discharge outlet from each of said air compression cylinders to impose a braking load upon said shaft.

THOMAS L. SHERMAN.

REFERENCES CITED

The following references are of record in the file of this patent:

UNITED STATES PATENTS

| Number | Name | Date |
| --- | --- | --- |
| 437,376 | Chapleau | Sept. 30, 1890 |
| 660,390 | Ogden | Oct. 23, 1900 |
| 1,553,854 | Fornaca | Sept. 15, 1925 |
| 1,565,184 | Miller | Dec. 8, 1925 |
| 1,612,313 | Pierce | Dec. 28, 1926 |
| 1,614,886 | Galbreath | Jan. 18, 1927 |
| 1,706,391 | Benjamin | Mar. 26, 1929 |
| 1,829,780 | Beytes et al. | Nov. 3, 1931 |
| 1,894,033 | Farwell | Jan. 10, 1933 |
| 1,899,294 | Roeder | Feb. 28, 1933 |
| 2,031,625 | Wild et al. | Feb. 25, 1936 |
| 2,141,428 | Carroll | Dec. 27, 1938 |
| 2,215,058 | VanMaren | Sept. 17, 1940 |